O. S. KING.
SAFETY FUSE COUPLING FOR GAS TANK VALVES.
APPLICATION FILED OCT. 15, 1915.
1,211,173.
Patented Jan. 2, 1917.
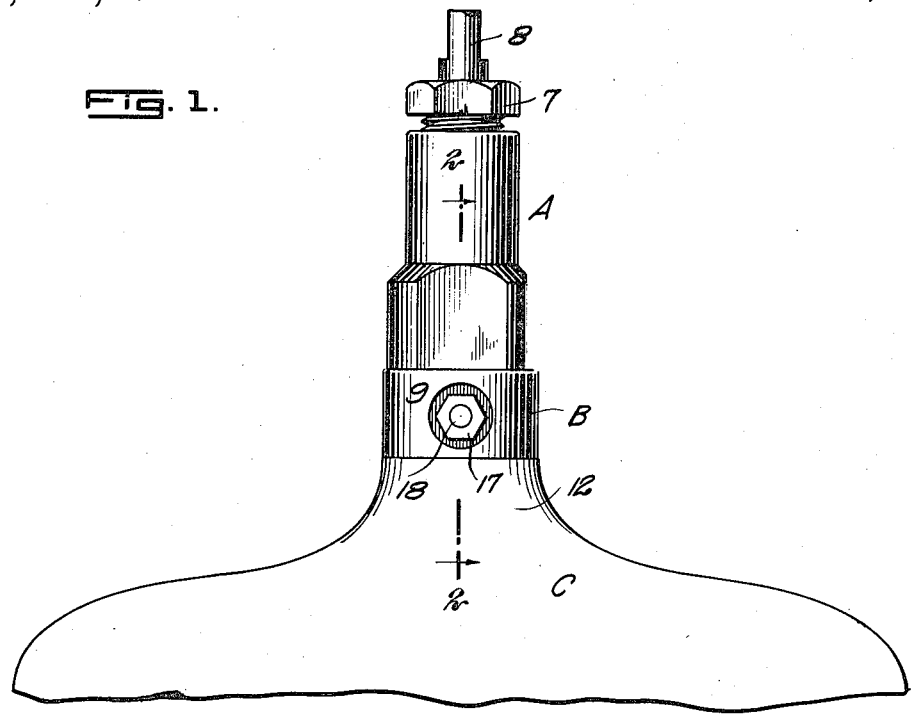
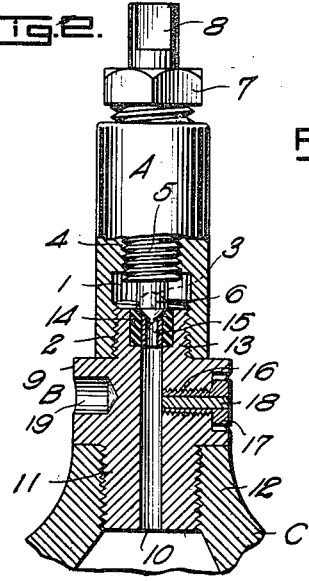
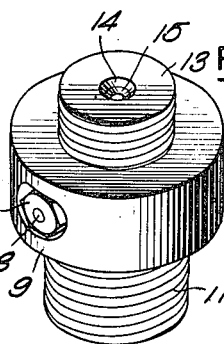
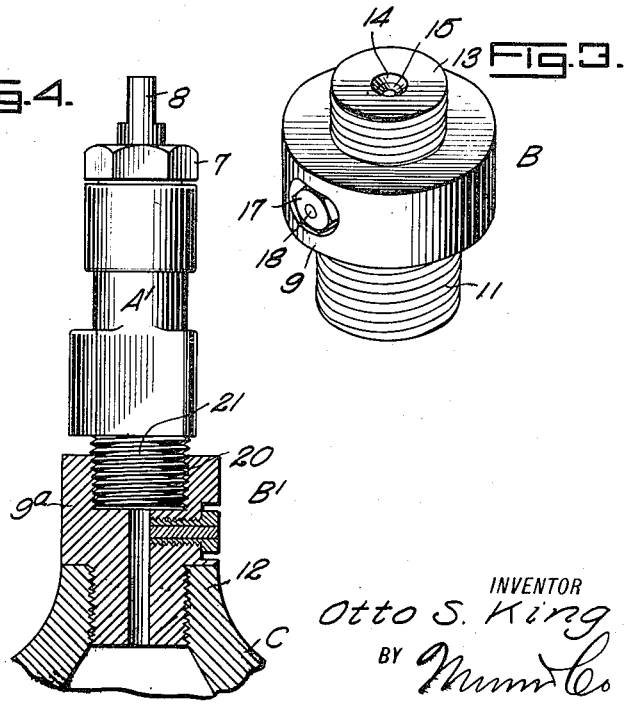
WITNESSES
INVENTOR
Otto S. King
BY
ATTORNEYS

UNITED STATES PATENT OFFICE.

OTTO S. KING, OF NEW YORK, N. Y.

SAFETY-FUSE COUPLING FOR GAS-TANK VALVES.

1,211,173.   Specification of Letters Patent.   Patented Jan. 2, 1917.

Application filed October 15, 1915. Serial No. 55,998.

*To all whom it may concern:*

Be it known that I, OTTO S. KING, a citizen of the United States, and a resident of the city of New York, borough of Manhattan, in the county and State of New York, have invented a new and Improved Safety-Fuse Coupling for Gas-Tank Valves, of which the following is a full, clear, and exact description.

This invention relates to safety devices especially adapted for use in connection with valves for tanks containing oxygen and other gas under great pressure, the safety device operating to provide a relief for the gas in case the internal pressure of the tank becomes greater than a predetermined point, due to a rise in temperature above a critical point, whereby the explosion of the tank is prevented.

The general objects of the present invention are to provide an improved safety device of the character referred to, so as to be reliable and efficient in use, comparatively simple and inexpensive to manufacture, and so designed as to be used in connection with tanks or cylinders of ordinary construction.

A more specific object of the invention is the provision of a combined valve coupler and safety device which is interposed between the outlet valve of the tank and the neck of the latter, the coupler and safety device having an opening closed by a fusible plug, the metal of which fuses when the temperature reaches a predetermined point so that a safety outlet for gas will be provided between the tank and valve.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a side view of a gas valve and the combined coupling and safety device applied to a gas cylinder; Fig. 2 is a sectional view of the coupler and safety device in connection with the valve and gas cylinder; Fig. 3 is a perspective view of the coupler and safety device; and Fig. 4 is a view showing a modified form of coupler and safety device in section and a gas valve in elevation connected therewith.

Referring to the drawing, A designates a gas valve, B the combined coupler and safety device, and C a gas cylinder or tank. The valve A comprises a suitable body having a chamber 1 and an open bottom which is provided with an internal thread 2, and leading from the chamber is an outlet opening 3, shown by dotted lines in Fig. 2. The body or casing of the valve has a threaded bore 4 in which is screwed the threaded stem or shank 5 of the conical valve 6. The upper end of the valve stem passes out through a gland nut 7, and the extremity 8 is non-circular to receive a wrench or hand-wheel for turning the valve open or closed.

The combined coupler and safety device consists of a suitably shaped body 9 provided with a central passage 10. The bottom of the body 9 has a threaded nipple 11 which screws into the neck 12 of the gas holder C. The upper end of the body 9 has an externally threaded nipple 13 which screws into the bottom of the body of the valve A and forms the bottom of the chamber 1. The nipple 13 carries a valve seat which is in the form of a block or sleeve of hard rubber 14 having a small tube of brass 15 fastened therein and which, together with the rubber plug 14, is conically countersunk to form the seating surface for the valve 6. Extending laterally from the passage 10 is an opening 16 which is normally closed by a fusible device in the form of a screw 17 which has a longitudinal passage filled with fusible metal 18. When the temperature of the air surrounding the gas holder C reaches a certain point the metal 18 fuses and is blown out by the internal pressure in the gas holder so that a relief to the atmosphere is provided to thereby prevent explosion of the gas holder under abnormal temperatures. After the safety device has thus blown, the screw 17 is taken out and a new fuse plug inserted, so that the gas holder can be recharged and used again. If the body portion 9 of the device B be circular, a socket 19 is formed in one side to receive an instrument for facilitating the screwing and unscrewing of the device on or off the gas holder C.

In the modification shown in Fig. 4 the combined coupler and safety device B is designed for use in connection with an old-style gas valve A'. In this case the body $9^a$ has a threaded socket 20 for receiving the screw-threaded nipple 21 on the body of the valve. In other respects the device B' is like the device shown in Fig. 2.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a gas container, an outlet valve, and a combined coupler and safety device interposed between and separate from the container and valve.

2. The combination of a gas container, a valve, and a coupler having a threaded connection with the valve and container and provided with a safety relief normally closed by fusible material.

3. The combination of a gas container, an outlet valve, a coupling device comprising a body formed with a passage communicating with the valve and container and also provided with a lateral passage, and a fuse plug normally closing the latter passage.

4. The combination of a valve device including a valve element, a gas container, and a coupler between the valve device and container, said coupler forming a seat for the valve element and also a safety means for permitting the escape of gas from the container when the temperature of the surrounding air reaches a predetermined point.

5. The combination of a valve device including a casing open at its bottom, and a threaded valve element in the casing, a gas container, and a coupler having threaded connection with the container and valve casing and forming a seat for the valve element, and a safety device for permitting the escape of gas under pressure when the temperature surrounding the container reaches a predetermined point.

6. A combined coupler and safety device comprising a body having a passage therethrough, and the ends being threaded for connection with a valve device and a gas container, an opening leading from the passage at a point intermediate its ends, and a fuse plug removably fitted in the said opening.

In testimony whereof I have signed my name to this specification in the presence of two subscribing witnesses.

OTTO S. KING.

Witnesses:
C. BRADWAY,
PHILIP D. ROLLHAUS.